United States Patent [19]

Tosaka

[11] Patent Number: 6,011,809

[45] Date of Patent: Jan. 4, 2000

[54] MULTI-WAVELENGTH LASER APPARATUS AND CONTINUOUS VARIABLE WAVELENGTH LASER APPARATUS

[75] Inventor: Fuki Tosaka, Nakai-machi, Japan

[73] Assignee: Terumo Kabushiki Kaisha, Tokyo, Japan

[21] Appl. No.: 08/935,954

[22] Filed: Sep. 23, 1997

[30] Foreign Application Priority Data

Sep. 25, 1996 [JP] Japan .................................... 8-253069
Apr. 16, 1997 [JP] Japan .................................... 9-098843

[51] Int. Cl.[7] .................................................. H01S 3/108
[52] U.S. Cl. .............................. 372/21; 359/330; 372/23
[58] Field of Search .......................... 372/20–24; 359/330

[56] References Cited

U.S. PATENT DOCUMENTS

| | | | |
|---|---|---|---|
| 5,017,806 | 5/1991 | Edelstein et al. | 372/21 X |
| 5,206,868 | 4/1993 | Deacon | 372/21 |
| 5,249,193 | 9/1993 | Watanabe | 372/23 |
| 5,260,953 | 11/1993 | Rowe | 372/20 |
| 5,296,960 | 3/1994 | Ellingson et al. | 372/20 X |
| 5,400,173 | 3/1995 | Komine | 372/21 X |
| 5,410,560 | 4/1995 | Taira | 372/21 |
| 5,412,674 | 5/1995 | Scheps | 372/22 |
| 5,541,946 | 7/1996 | Scheps et al. | 372/23 |
| 5,634,922 | 6/1997 | Hirano et al. | 606/10 |
| 5,740,190 | 4/1998 | Moulton | 372/23 |

FOREIGN PATENT DOCUMENTS

| | | |
|---|---|---|
| 63-159832 | 7/1988 | Japan . |
| 63-170619 | 7/1988 | Japan . |
| 3-159661 | 7/1991 | Japan . |
| 3-47755 | 7/1991 | Japan . |
| 3-62311 | 9/1991 | Japan . |
| 4-84478 | 3/1992 | Japan . |
| 4-78198 | 12/1992 | Japan . |
| 5-84314 | 4/1993 | Japan . |
| 6-1317 | 1/1994 | Japan . |
| 6-194 | 1/1994 | Japan . |
| 6-222 | 1/1994 | Japan . |
| 6-94571 | 4/1994 | Japan . |
| 6-188498 | 7/1994 | Japan . |
| 6-241908 | 9/1994 | Japan . |
| 6-265491 | 9/1994 | Japan . |
| 7-88202 | 4/1995 | Japan . |
| 7-170003 | 7/1995 | Japan . |
| 2573774 | 10/1996 | Japan . |
| 2581488 | 11/1996 | Japan . |

OTHER PUBLICATIONS

B.N. Ara et al., "Ar and Kr gas Laser (White Lasers)," C (25), No. 5, 1976, pp. 791–795. (English Abstract Attached).

Fu Yunpeng, "Study of 50 m W high power helium–cadmium white light laser," Laser Journal, vol. 7, No. 12, 1980, pp. 10–13. (English Abstract Attached).

B.B. Hahhep et al., "He–Cd–Hg white gas Laser," Kabaht, etc., vol. 10, No. 4, 1983, pp. 677–678. (English Abstract Attached).

J.A. Giordmaine et al., "Tunable Coherent Parametric Oscillation in LiNb3 At Optical Frequencies," Physical Review Letters, vol. 14, No. 24, Jun. 14, 1965, pp. 973–976.

Y.X. Fan et al., "Efficient high–power harmonic generation in B–BaB204," Optical Society of America, Washington, D.C., Thursday Afternoon, Jun. 12, 1986, pp. 322–323.

Yunping Wang et al., "Highly efficient visible and infrared B–BaB204 optical parametric oscillator with pump reflection," Appl. Phys. Lett., vol. 58, No. 14, Apr. 8, 1991, pp. 1461–1463.

Chung L. Tang et al., "Optical Parametric Oscillators," Proceedings of the IEEE, vol. 80, No.3, Mar. 1992, pp. 365–374.

Sheng Wu et al., "An OPO ring cavity with no coatings," Technical Digest, Conf. on Lasers and Electro–Optics, 1996 Technical Digest Series, vol. 9, Postconference Edition, Jun. 2–7, 1996, pp. 370–371.

Primary Examiner—John D. Lee
Attorney, Agent, or Firm—Burns, Doane, Swecker & Mathis, LLP

[57] ABSTRACT

It is an object of the present invention to provide a multi-wavelength laser apparatus and a continuous variable wavelength laser apparatus capable of simultaneously outputting laser beams with a plurality of wavelengths and generating up to a high laser output without causing any optical damage. To achieve this object, a multi-wavelength laser apparatus including an optical parametric oscillator having a nonlinear optical crystal and an excitation laser light source includes mirrors for dividing a laser beam emitted from the excitation laser light source into at least three optical axes, and a ring type resonator which simultaneously inputs the laser beams divided by these mirrors at different angles to the nonlinear optical crystal, thereby making the nonlinear optical crystal generate laser beams with at least six different wavelengths, and which does not cause any optical damage up to a high laser output.

7 Claims, 5 Drawing Sheets

MULTI-WAVELENGTH LASER APPARATUS AND CONTINUOUS VARIABLE WAVELENGTH LASER APPARATUS

BACKGROUND OF THE INVENTION

1. Field of the Invention

The present invention relates to a laser apparatus for use in the fields of medical services (diagnoses and treatments), physicochemistry, and industries.

2. Description of the Related Art

A gas laser apparatus is generally used as a conventional laser apparatus capable of multi-wavelength simultaneous oscillation. Laser apparatuses capable of outputting white light are announced in B. . Aran, B. K. E а з ы е в ( C(25)791, 1976), FU YUN peng (Laser, 7–12, 10, 1980), or B. B. B а  Н е р,    р (К а в а н т.    е к т р, (10)672, 1983).

Also, as a continuous variable wavelength laser apparatus, an OPO (Optical Parametric Oscillator) laser which uses wavelength conversion using a nonlinear optical crystal is considered as a promising easy-to-maintain, solid-state laser because this laser has a wide variable wavelength range. J. A. Gioordmaine et al. (Phys. Rev. Lett., (14)973, 1965) first reported oscillation of an OPO laser using $LiNbO_3$ (lithium niobate). However, this oscillation was not put into practical use because the damage threshold of the crystal was too low. In 1985, Fujian Institute of Research on the Structure of Matter, Chinese Academy of Sciences announced BBO: $\beta$-$BaB_2O_4$ (beta barium borate) as a nonlinear optical crystal with a high damage threshold (Y. X. Fan, R. C. Eckardt, R. L. Byer, C. Chen and A. D. Jiang). In 1986, the first OPO oscillation using the BBO crystal was confirmed (Optical Society of America, Washington, D.C., 1986). Since then, it has become possible to continuously output wavelengths over a broad range of 410 to 2,600 nm by using a single BBO crystal, and this method has been put into practical use.

Conventionally, as a resonator for use in an OPO laser apparatus, an apparatus which reciprocates a laser beam by using parallel plate mirrors is known. For example, Yunping Wang et al. announced an apparatus in Appl. Phys. Lett. 58(14), Apr. 8, 1991, pp. 1461–1463, and Tang C. L. et al. announced an apparatus in Proc. IEEE 80 pp. 365–374, 1992.

In these apparatuses, dielectric multilayered films are formed on the surfaces of parallel plate mirrors constituting an oscillator. Accordingly, these dielectric films are burned and damaged while optical amplification is repetitively performed.

To solve this problem, Sheng Wu (Division of Chemistry, California Institute of Technology) and Zhao Yang Sun (CASIX CO., China) announced an apparatus using a ring resonator capable of constituting an oscillator without using dielectric films in CLEO, 96(1996), "An OPO ring cavity with no coating". In this apparatus, an input/output mirror is arranged at an angle of 45° to an excitation optical axis, and two BBO nonlinear optical crystals are arranged in an oscillation circuit.

Of the conventional apparatuses described above, however, a gas laser apparatus as one conventional multi-wavelength laser apparatus is large-scaled and lacking stability. A conventional OPO laser apparatus can continuously vary the wavelength by using a single nonlinear optical crystal. On the other hand, the apparatus cannot simultaneously output laser beams with a plurality of wavelengths, and this has limited the applications of the apparatus.

In a continuous variable wavelength laser apparatus, an input/output mirror is arranged at an angle of 45° to an excitation optical axis as described above. Consequently, both the excitation efficiency and the oscillation efficiency are low, and this increases the threshold value of oscillation.

Also, when two nonlinear optical crystals are arranged in a ring-like oscillation circuit, a device for pivoting the nonlinear optical crystals to change the wavelength of an oscillating laser is complicated. This makes the apparatus difficult to put into practical use.

SUMMARY OF THE INVENTION

The present invention, therefore, has been made in consideration of the above problems, and has as its object to provide a multi-wavelength laser apparatus and a continuous variable wavelength laser apparatus capable of simultaneously outputting laser beams with a plurality of wavelengths and generating up to a high laser output without causing any optical damage.

It is another object of the present invention to provide a continuous variable wavelength laser apparatus capable of increasing the excitation efficiency and the oscillation efficiency without using any dielectric films.

To solve the above problems and achieve the objects, a multi-wavelength laser apparatus according to the present invention is characterized by the following arrangement.

That is, a multi-wavelength laser apparatus including an optical parametric oscillator having a nonlinear optical crystal and an excitation laser light source, comprises dividing means for dividing a laser beam emitted from the excitation laser light source into at least two optical axes, and incident angle setting means for simultaneously inputting the laser beams divided by the dividing means at different angles to the nonlinear optical crystal, wherein the nonlinear optical crystal is made to generate laser beams with at least four different wavelengths.

According to the first aspect, a continuous variable wavelength laser apparatus according to the present invention is characterized by the following arrangement.

That is, a continuous variable wavelength laser apparatus including an optical parametric oscillator having a pivotally arranged nonlinear optical crystal and an excitation laser light source, comprises pivoting means for pivoting the nonlinear optical crystal, and a ring type resonator including a mirror for transmitting an excitation laser beam emitted from the excitation laser light source and reflecting a portion of a laser beam whose wavelength is converted by the nonlinear optical crystal while transmitting the rest of the laser beam, and two prisms for reflecting the wavelength-converted laser beam, the ring type resonator oscillating the wavelength-converted laser beam.

According to the second aspect, a continuous variable wavelength laser apparatus according to the present invention is characterized by the following arrangement.

That is, a continuous variable wavelength laser apparatus including a nonlinear optical crystal, and a ring resonator having a plurality of laser beam reflecting means for resonating an excitation laser beam to be incident on the nonlinear optical crystal, wherein an incident angle of the laser beam reflecting means arranged in an excitation laser beam incident portion of the ring resonator is set at a Brewster angle.

According to the third aspect, a continuous variable wavelength laser apparatus according to the present invention is characterized by the following arrangement.

That is, a continuous variable wavelength laser apparatus including a nonlinear optical crystal, and a ring resonator having a plurality of laser beam reflecting means for resonating an excitation laser beam to be incident on the nonlinear optical crystal, comprises a ring resonator including a calibration prism for correcting an optical path of an output wavelength-converted laser beam from the nonlinear optical crystal, a prism for totally reflecting the wavelength-converted laser beam at an angle of 180°, and two nonlinear optical crystals, and pivoting means for pivoting the two nonlinear optical crystals in opposite directions.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will be described in detail below with reference to the accompanying drawings.

First Embodiment

Figure 1:
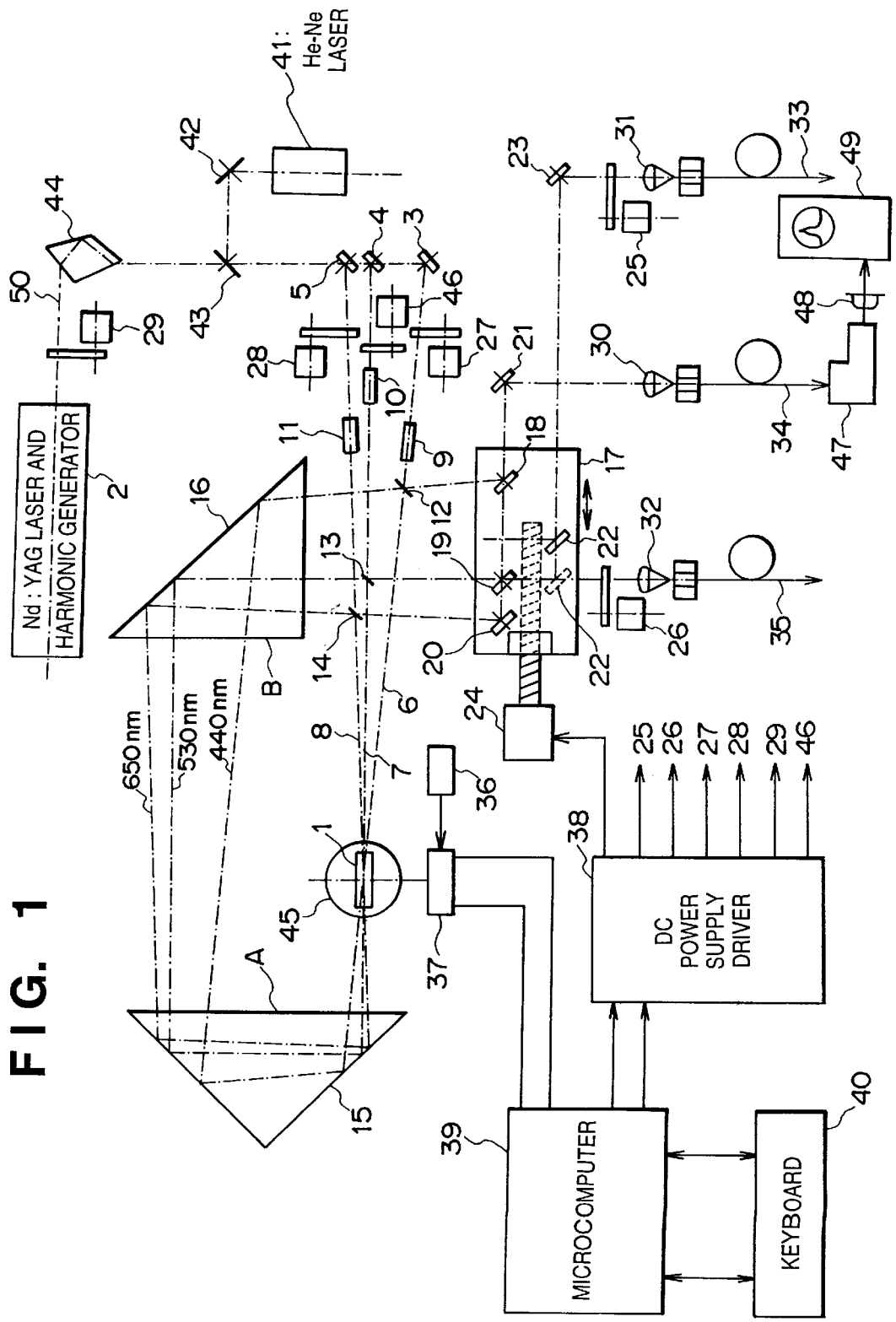
FIG. 1 is a view showing the arrangement of a continuous variable wavelength laser apparatus capable of three-wavelength simultaneous oscillation according to the first embodiment of the present invention.

FIG. 1 shows the arrangement of a continuous variable wavelength laser apparatus capable of three-wavelength simultaneous oscillation as the first embodiment of a multi-wavelength laser apparatus and a continuous variable wavelength laser apparatus based on the present invention. Reference numeral 1 denotes β-BaB$_2$O$_4$ (beta barium borate) as a nonlinear optical crystal which is cut out with crystal orientation so determined as to meet a 30° type 1 phase matching condition with respect to a excitation wavelength of 354.7 nm. Reference numeral 45 denotes a rotary stage which is pivoted while it is supporting the nonlinear optical crystal 1; and 37, a driver for a stepping motor as a driving source of the rotary stage 45. The driver 37 controls the rotational angle of the rotary stage 45. Reference numeral 36 denotes a power supply for the stepping motor 37; and 2, an excitation light source. The excitation light source 2 generates an Nd:YAG laser beam with a wavelength of 1,064 nm and also converts the wavelength of this laser beam to generate a laser beam with a wavelength of 532 nm as a double wave and a laser beam with a wavelength of 354.7 nm as a triple wave. A shutter 29 shuts off and passes laser beams 50 emitted from the excitation light source 2.

A pellin Broca prism 44 receives the three laser beams 50 emitted from the excitation light source 2 and having the different wavelengths described above, separates the laser beams with the three wavelengths at different angles, and outputs only the laser beam with a wavelength of 354.7 nm to mirrors 3, 4, and 5 via a mirror 43. Reference numeral 41 denotes a helium neon laser. The optical path of a laser beam from this helium neon laser 41 is adjusted by a total reflection mirror 42, and the laser beam is superposed on the same optical axis as the 354.7-nm laser beam output from the pellin Broca prism by the mirror 43. In this manner, the helium neon laser 41 is used in optical axis adjustment and calibration of this laser apparatus.

The mirrors 3, 4, and 5 divide the 354.7-nm laser beam into three optical axes and output the divided laser beams at angles of 26°, 31.15°, and 32.88°, respectively, to the optical axis of the nonlinear optical crystal 1. Galilean telescopes 9, 10, and 11 adjust the beam diameters of the 354.7-nm laser beams reflected by the mirrors 3, 4, and 5, respectively. Shutters 27, 46, and 28 shut off and pass the 354.7-nm laser beams reflected by the mirrors 3, 4, and 5, respectively.

Molten silica glass is directly used as mirrors 12, 13, and 14 which transmit the output 354.7-nm laser beams from the Galilean telescopes. The mirrors 12, 13, and 14 also reflect a portion of the laser beams with wavelengths of 440, 530, and 650 nm emitted from the nonlinear optical crystal 1 and transmit the rest. Reference numerals 15 and 16 denote prisms having no reflection coating. The prisms 15 and 16 are combined with the mirrors 12, 13, and 14 to constitute a ring resonator for the laser beams with wavelengths of 440, 530, and 650 nm. Reference numerals 6, 7, and 8 denote the optical paths of laser beams resonated by the ring resonator and correspond to the 440-, 530-, and 650-nm laser beams, respectively.

Reference numerals 18, 19, and 20 denote mirrors which selectively totally reflect the 440-, 530-, and 650-nm laser beams described above. The mirrors 18, 19, and 20 also superpose these laser beams on the same optical axis and output the laser beam to an optical fiber 34 via a total reflection mirror 21 and a condenser lens 30 for these three wavelengths. For this purpose, the mirror 18 is so coated as to totally reflect a wavelength of 440±25 nm and have a transmittance of 85% or more for wavelengths of 530±25 nm and 650±25 nm. The mirror 19 is so coated as to totally reflect a wavelength of 530±25 nm and have a transmittance of 85% or more for a wavelength of 650±25 nm. The mirror 20 is so coated as to totally reflect a wavelength of 650±25 nm.

Reference numeral 22 denotes a mirror having a wavelength selectivity. The mirror 22 is so coated as to have a transmittance of 90% or more for wavelengths from 730 to 2,600 nm and totally reflect wavelengths from 410 to 710 nm. The optical path of the laser beam totally reflected by the mirror 22 is changed by a mirror 23, and the laser beam is incident on an optical fiber 33 via a condenser lens 31. Also, the laser beam transmitted through the mirror 22 is incident on an optical fiber 35 via a condenser lens 32. Shutters 25 and 26 shut off and pass the laser beams entering the condenser lenses 31 and 32, respectively.

An optical path switching mechanism 17 is driven by a stepping motor 24 to select an output laser beam by moving the mirrors 18, 19, 20, and 22. Reference numeral 38 denotes a driver for the stepping motor 24 and for the shutters 25, 26, 27, 28, 29, and 46.

A computer 39 and its keyboard 40 are used to designate operations of the drivers 37 and 38. A monochrometer 47 receives an output laser beam from the optical fiber 34. The output beam is received by a photodetector 48 and displayed on an oscilloscope 49. In this manner, the wavelength of the output laser beam from the optical fiber 34 is checked. Note that the monochrometer 47 and the photodetector 48 are used only in checking the wavelength of a laser beam and are therefore removed from the optical path when the output laser beam from the optical fiber 34 is actually used in a medical treatment or the like.

Figure 2:
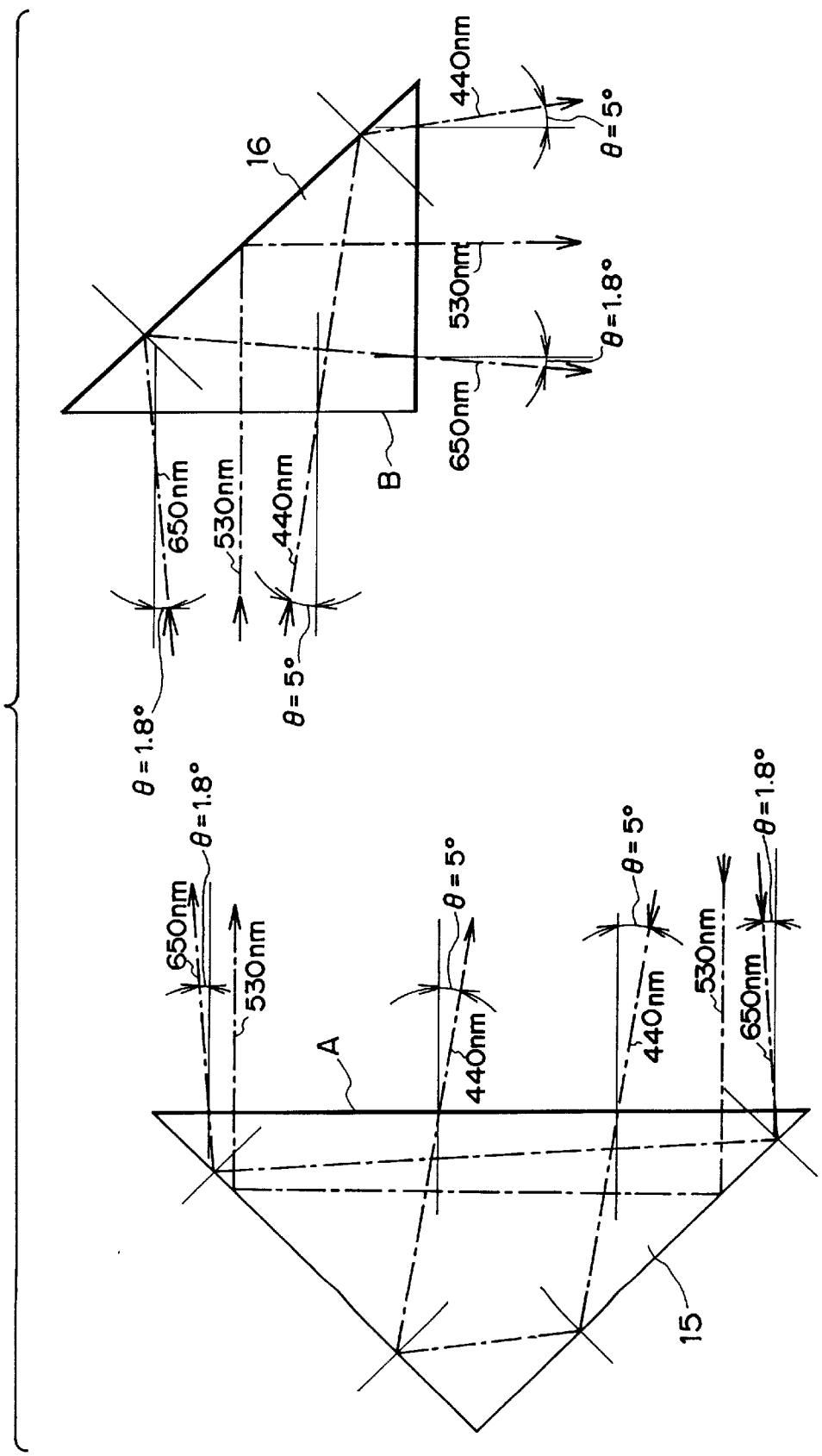
FIG. 2 is a plan view showing the incident and exit angles of oscillation wavelengths of three primary colors with respect to prisms 15 and 16 which constitute a ring resonator in the first embodiment of the present invention.

FIG. 2 clearly shows practical angles at which laser beams with wavelengths of 440, 530, and 650 nm are incident or emerge in order to constitute the ring resonator by using the prisms 15 and 16.

The operation of the continuous variable wavelength laser apparatus with the above arrangement capable of three-wavelength simultaneous oscillation will be described below with reference to FIG. 1. Of laser beams with wavelengths of 1,064, 532, and 354.7 nm emitted from the excitation light source 2, the optical path of only the 354.7-nm laser beam is selected by the pellin Broca prism 44. This laser beam is incident as excitation light on the mirrors 3, 4, and 5 and divided into three beams. To allow the nonlinear optical crystal 1 to perform efficient wavelength conversion, the beam diameters of these three laser beams are adjusted by the Galilean telescopes 9, 10, and 11. Thereafter, the laser beams are transmitted through the mirrors 12, 13, and 14 by using their polarization characteristics and incident on the nonlinear optical crystal 1 at the incident angles described above. A portion of the excitation light reflected by the mirror 3 and transmitted through the Galilean telescope 9 is converted into laser beams with wavelengths of 440 and 1,829.6 nm by the nonlinear optical crystal 1. Analogously, a portion of the excitation light reflected by the mirror 4 and transmitted through the Galilean telescope 10 is converted into laser beams with wavelengths of 530 and 1,072.4 nm. Also, a portion of the excitation light reflected by the mirror 5 and transmitted through the Galilean telescope 11 is converted into laser beams with wavelengths of 650 and 780.7 nm. The 440-, 530-, and 650-nm laser beams are resonated by the ring resonator constituted by the prisms 15 and 16 and the mirrors 12, 13, and 14. Also, portions of these laser beams are transmitted through the mirrors 12, 13, and 14 and emerge as output laser beams to the mirrors 18, 19, and 20. The 440-, 530-, and 650-nm laser beams described above are reflected by the mirrors 18, 19, and 20 and at the same time superposed on the same optical axis to form a single white (by mixing three primary colors) laser beam. The optical path of this laser beam is changed by the mirror 21, and the laser beam is connected to the optical fiber 34 by the condenser lens 30 and guided to a target irradiation position by the optical fiber 34.

As described previously, the mirrors 12, 13, and 14 and the prisms 15 and 16 are not coated for reflection or transmission. Accordingly, it is possible to avoid the conventional problem of optical damage in resonator mirrors during a high-output operation. Note that the laser beams with wavelengths of 1,829.6, 1,072.4, and 780.7 nm are not incident on the optical fiber 34 because they transmit through the mirrors 18, 19, and 20.

The above operation of this apparatus explains the function as a multi-wavelength laser apparatus, and laser beams of three primary colors can be simultaneously obtained as output laser beams from the end portion of the optical fiber 34. As an output laser beam, it is also possible, where necessary, to select one or a combination of arbitrary two of the 440-, 530-, and 650-nm laser beams by opening/closing the shutter 27, 46, or 28 by the computer 39. Absolute value calibration can be performed for the wavelength of the exit laser beam from the optical fiber 34 by using the combination of the monochrometer 47, the photodetector 48, and the oscilloscope 49.

The operation of this apparatus as a continuous variable wavelength laser apparatus will be described next.

The shutters 27 and 28 are closed by the computer 39 and the driver 38 so that the nonlinear optical crystal 1 generates only the laser beam 7. At the same time, the stepping motor 24 is operated to move the optical path switching mechanism 17, thereby removing the mirrors 18, 19, and 20 from the optical paths of the laser beams 6, 7, and 8, respectively, and positioning the mirror 22 on the optical path of the laser beam 7 as indicated by the broken line in FIG. 1. As will be described later, the wavelength of the laser beam 7 is changed from 410 to 2,600 nm by changing the incident angle of excitation light to the nonlinear optical crystal 1 by using the rotary stage 45. Of these wavelengths, a laser beam with a wavelength of 730 to 2,600 nm transmitted through the mirror 22 is incident on the condenser lens 32 and coupled to the optical fiber 35. Also, the optical path of a laser beam with a wavelength of 410 to 710 nm reflected by the mirror 22 is changed by the mirror 23. Consequently, this laser beam is incident on the condenser lens 31 and coupled to the optical fiber 33.

The wavelength of an output laser beam can be set by inputting an arbitrary wavelength from the keyboard 40 to the computer 39. That is, the computer 39 determines the set angle of the nonlinear optical crystal 1 at which the input target wavelength is obtained, and adjusts the nonlinear optical crystal 1 to this set angle by driving the rotary stage 45 via the driver 37. Similarly, when the range of wavelengths that the user wants to output from this apparatus is input to the computer 39, the rotary stage 45 continuously rotates to allow the set angle of the nonlinear optical crystal 1 to be continuously changed. Consequently, the wavelength of the output laser beam can be continuously changed over the range of 410 to 2,600 nm. By closing the shutter 25 and opening the shutter 26, a laser beam ranging in wavelength from 730 to 2,600 nm can be output from the optical fiber 35. By closing the shutter 26 and opening the shutter 25, a laser beam ranging in wavelength from 410 to 710 nm can be output from the optical fiber 33. Also, when both the shutters 25 and 26 are open, it is naturally possible to obtain laser beams ranging in wavelength from 410 to 710 nm and from 730 to 2,600 nm at the same time.

Note that the position adjustment of the optical parts or the calibration of the absolute wavelength described above in this apparatus having the functions of a multi-wavelength laser apparatus and a continuous variable wavelength laser apparatus is performed by superposing the helium neon laser 41 on the optical axis of the laser beam of this apparatus via the mirror 43.

In the arrangement of the first embodiment as described above, output laser beams with a plurality of wavelengths can be simultaneously obtained by using a single nonlinear optical crystal in a multi-wavelength laser apparatus. Additionally, even when high-output excitation light is used in a multi-wavelength laser apparatus or a continuous variable wavelength laser apparatus, optical damages in an optical parametric resonator can be effectively reduced. Therefore, the first embodiment has a notable practical effect and greatly helps widen the applications of a multi-wavelength laser apparatus and a continuous variable wavelength laser apparatus.

Second Embodiment

Figure 3:
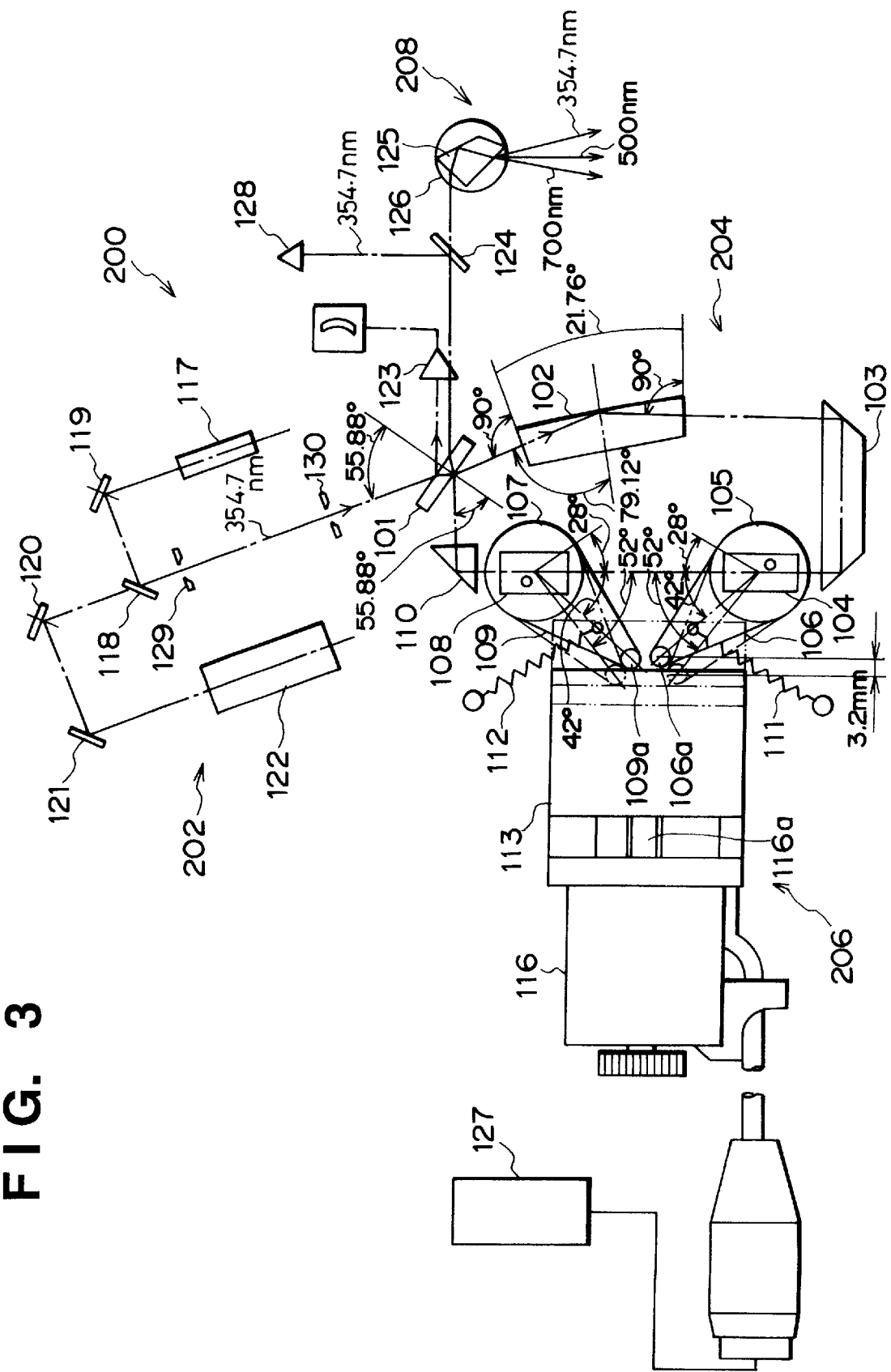
FIG. 3 is a view showing the arrangement of a continuous variable wavelength laser apparatus according to the second embodiment.

FIG. 3 is a view showing the arrangement of a continuous variable wavelength laser apparatus according to the second embodiment of the present invention.

Referring to FIG. 3, a continuous variable wavelength laser apparatus 200 generally comprises an excitation light source unit 202 for generating an excitation laser beam, a ring resonator 204 for receiving the excitation laser beam emitted from the excitation light source unit 202, a pivoting mechanism 206 for pivoting two nonlinear optical crystals, arranged in the ring resonator 204, with respect to the optical axis of the resonator, and a spectral prism unit 208 for spectrally diffracting the output laser beam from the ring resonator 204.

In FIG. 3, reference numeral 122 denotes a solid-state laser (to be referred to as a solid-state laser hereinafter) serving as a light source for an excitation laser beam and incorporating a high-output-pulse Nd:YAG laser and a wavelength conversion element. This solid-state laser 122 outputs a laser beam in an ultraviolet region with a wavelength of 354.7 nm. 45° total reflection mirrors 121 and 120 are arranged in front of and on the optical axis of the solid-state laser 122. The output beam from the solid-state laser 122 is bent through 180° by these total reflection mirrors 121 and 120 and incident on a 45° mirror 118. The 45° mirror 118 is so coated as to have a high transmittance to light with a wavelength of 354.7 nm and totally reflect a laser beam with a wavelength of 633 nm from an He—Ne laser 117 (to be described later).

Accordingly, most of the laser beam from the solid-state laser 122 transmits through the 45° mirror 118 and enters an input/output (I/O) mirror 101. In this embodiment, the I/O mirror 101 is made of parallel plate quartz glass. The I/O mirror 101 is arranged at an angle at which the incident angle of the solid-state laser beam is a Brewster angle.

A Brewster angle will be explained below.

When light is incident on an optical medium at a certain incident angle, the reflectance of a polarized component (to be referred to as a horizontally polarized component hereinafter) parallel to the incident plane is zero, and the reflectance of a polarized component (to be referred to as a vertically polarized component hereinafter) perpendicular to the incident plane increases. This incident angle is a Brewster angle.

A Brewster angle $\theta_B$ is determined by the refractive index of an optical medium and represented by the following equation.

$$\theta_B = \tan^{-1}(n_t/n_i) \quad (1)$$

where $n_i$ is the refractive index of air and $n_t$ is the refractive index of an optical medium.

In this embodiment, the solid-state laser 122 outputs a horizontally polarized laser beam, and this excitation laser beam is incident at the Brewster angle on the I/O mirror 101. Consequently, the excitation laser beam transmits through the I/O mirror 101 at a transmittance of substantially 100% and enters the ring resonator 204 after the I/O mirror 101 at a high efficiency. In this embodiment, quartz glass is used as the material of the I/O mirror 101. In this case, the Brewster angle $\theta_B$ of an excitation laser beam with a wavelength of 354.7 nm is 55.88°. Note that synthetic quartz glass, $CaF_2$, LiF, and NaCl, for example, can also be used as the material of the I/O mirror 101 in addition to quartz glass. However, if a material other than quartz glass is used, the refractive index changes, and the Brewster angle also changes. Therefore, the angle of the I/O mirror 101 must be adjusted in accordance with the change.

In the initial state, the I/O mirror 101 is so arranged that the solid-state laser beam is incident at an angle of about 55°. At this angle, the solid-state laser beam (horizontally polarized light) is slightly reflected by the I/O mirror 101. This reflected laser beam is detected by a high-sensitivity optical power meter 123. The angle of the I/O mirror 101 is so adjusted that the intensity of the light incident on the optical power meter 123 is a minimum, in other words, the amount of the solid-state laser beam reflected by the I/O mirror 101 is a minimum. The angle of the I/O mirror 101 at which the reflected light amount of the solid-state laser is a minimum is a Brewster angle. With this adjustment, the I/O mirror 101 is accurately set at the Brewster angle (55.88°).

An angle calibration prism 102 is arranged on the optical axis of the excitation laser beam transmitted through the I/O mirror 101. The angle calibration prism 102 adjusts the optical path of light traveling round the ring resonator 204 so that the light is again incident on the I/O mirror 101 at the Brewster angle. More specifically, the angle calibration prism 102 bends the optical axis of the exit light from the I/O mirror 101 by 21.76°. Consequently, the light traveling round the ring resonator 204 is again incident on the I/O mirror 101 at the Brewster angle (55.88°).

A prism 103 is arranged on the optical path of the exit light from the angle calibration prism 102. The prism 103 has 45° total reflection surfaces on the two end portions and reverses the optical path of the excitation laser beam through 180°. On the optical path of this 180°-reversed laser beam, BBO (beta barium borate) crystals 104 and 108 as two nonlinear optical crystals are arranged. The crystal optical axes of the BBO crystals 104 and 108 must be changed with respect to the optical axis of the excitation laser beam in order to change the wavelength of the output laser beam from 410 to 2,600 nm. To change the directions of these crystal optical axes, the BBO crystals 104 and 108 are arranged on pivoting tables 105 and 107, respectively.

A mechanism for pivoting the pivoting tables 105 and 107 will be described below. Arms 106 and 109 are formed on the pivoting tables 105 and 107, respectively. Columnar driving pins 106a and 109a are fixed to the distal end portions of these arms 106 and 109. The arms 106 and 109 are biased by tension springs 111 and 112 in directions in which the driving pins 106a and 109a are constantly in contact with a slide stage 113. The slide stage 113 is so supported as to be slidable from side to side in FIG. 3 and slid from side to side in FIG. 3 by the rotation of a feed screw 116a attached to the rotating shaft of a stepping motor 116. A motor driver 127 is connected to the stepping motor 116, and the stepping motor 116 is rotated by a driving signal from the motor driver 127. In the pivoting mechanism with this construction, the slide stage 113 is moved from side to side in FIG. 3 by the rotation of the stepping motor 116, the driving pins 106a and 109a in contact with the slide stage 113 are moved, and the pivoting tables 105 and 107 are pivoted via the arms 106 and 109. Consequently, the two BBO crystals 104 and 108 are pivoted in a mirror symmetry state with respect to a virtual plane in the middle of the BBO crystals 104 and 108.

In the initial state, the two BBO crystals 104 and 108 are arranged such that their crystal optical axes are inclined 28° to the optical axis of the excitation light (a positive incident state), i.e., arranged in a mirror symmetry state with respect to the virtual plane intermediate between the two crystals. In this state, as shown in FIG. 3, the arms 106 and 109 of the pivoting tables 105 and 107 are inclined 42° to the optical axis of the excitation light. In the positive incident state in which their crystal optical axes are inclined 28° to the optical axis of the excitation light as described above, the two BBO crystals 104 and 108 oscillate two laser beams with wavelengths of 465±5 nm and 1,495±5 nm.

A 45° total reflection prism 110 is arranged on the optical axis of the exit laser beam from the two BBO crystals 104 and 108. Therefore, the direction of the oscillated laser beam is changed through 90°, and the laser beam is incident at the Brewster angle (55.88°) on the I/O mirror 101. The excitation light incident on the two BBO crystals 104 and 108 is horizontally polarized light. Since, however, the two BBO crystals 104 and 108 meet a type 1 phase matching condition, the exit oscillated light from these crystals is vertically polarized light. Therefore, when this vertically polarized light is incident at the Brewster angle on the I/O mirror 101, the I/O mirror 101 reflects the vertically polarized light at a high reflectance. This increases the quantity of light which again travels round the ring resonator 204. Accordingly, compared to a case where the I/O mirror 101 is arranged at an angle of 45°, the excitation efficiency and the oscillation efficiency in the ring resonator 204 are increased, and the threshold value of oscillation can be decreased.

Most of the oscillated light incident on the I/O mirror 101 is reflected by the I/O mirror 101 as described above. However, a portion of the light transmits through the I/O mirror 101 and enters a dichroic mirror 124. The dichroic mirror 124 is so coated as to totally reflect light with a wavelength of 354.7 nm and transmit light with wavelengths from 410 to 2,600 nm at a high transmittance. Therefore, the 354.7-nm excitation light component remaining in the oscillated light transmitting through the I/O mirror 101 is totally reflected by the dichroic mirror 124 and absorbed by an absorber 128. Meanwhile, the pure oscillated light transmitting through the dichroic mirror 124 is spectrally diffracted by a pellin Broca prism 125. This spectrally diffracted oscillated light is output as an output beam from the laser apparatus to the outside. The pellin Broca prism 125 is arranged on a pivoting table 126, and the direction of the prism is changed by this pivoting table. In this way, the pellin Broca prism 125 can spectrally diffract oscillated light with a given wavelength of 410 to 2,600 nm.

Note that the I/O mirror 101, the angle calibration prism 102, the prism 103, and the 45° total reflection prism 110 constituting the ring resonator 204 are not at all coated with, e.g., a dielectric film. Since, therefore, no film burning occurs even when optical amplification is repetitively performed, the durability is very high.

The difference between a case where the I/O mirror is arranged at 45° to the optical axis of the excitation light as in conventional apparatuses and a case where the I/O mirror is arranged at a Brewster angle as in this embodiment will be described below.

When light is incident on an optical medium from air, the reflectance of the light on the surface of the optical medium is represented by the following Fresnel's formulas assuming that the incident angle of the light is $\theta i$ and the refraction angle is $\theta t$.

$$Rp=\tan^2(\theta i-\theta t)/\tan^2(\theta i+\theta t) \quad (2)$$

$$Rs=\sin^2(\theta i-\theta t)/\sin^2(\theta i+\theta t) \quad (3)$$

$$R=\tfrac{1}{2}(Rp+Rs) \quad (4)$$

where Rp is the reflectance of linearly polarized light (horizontally polarized light) parallel to the incident plane, Rs is the reflectance of linearly polarized light (vertically polarized light) perpendicular to the incident plane, and R is the reflectance of natural polarized light.

The relationship between the incident angle $\theta i$ and the refraction angle $\theta t$ is represented by the following equation from Snell laws of refraction assuming that the refractive index of air is ni and the refractive index of an optical medium is nt.

$$ni \cdot \sin\theta i = nt \cdot \sin\theta t \quad (5)$$

Figure 4:
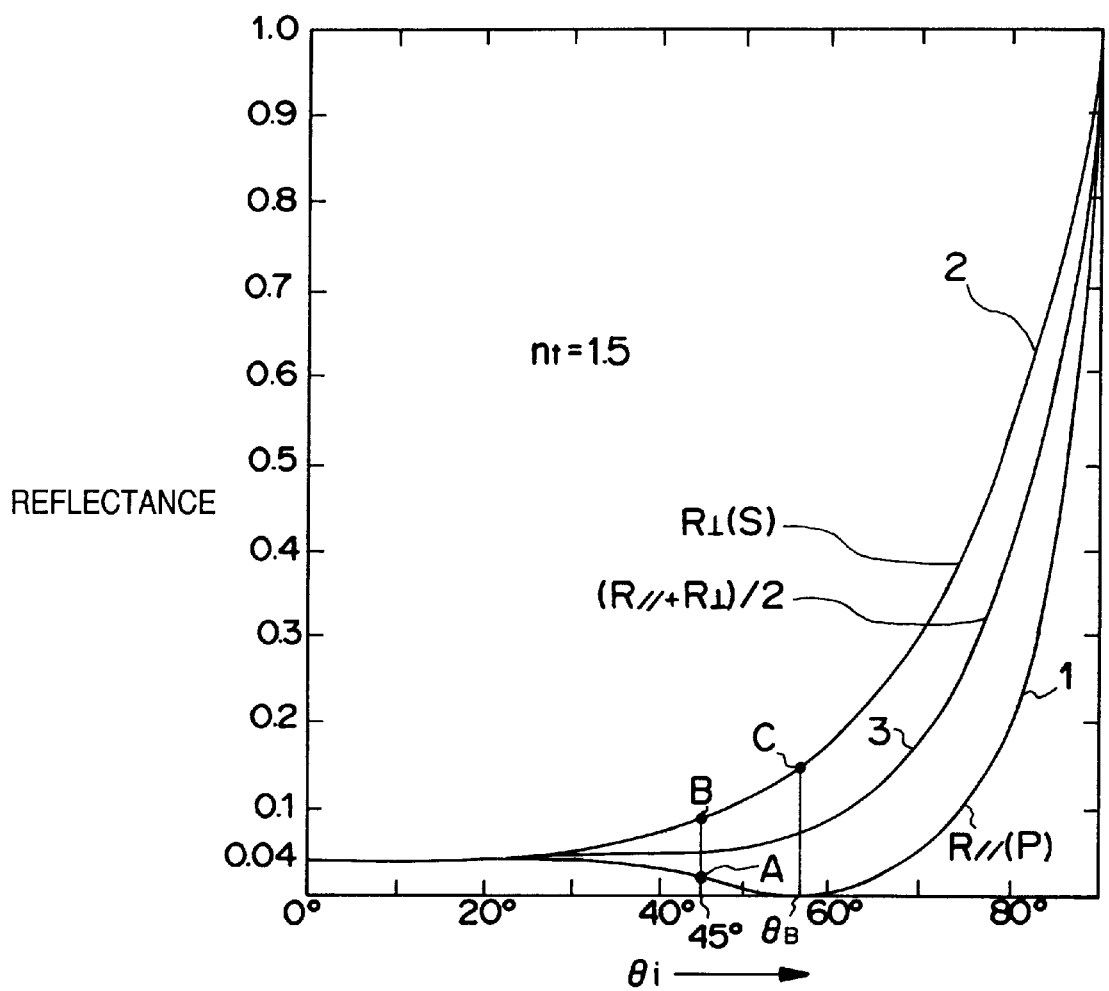
FIG. 4 is a graph showing the relationship between the incident angle and the reflectance.

FIG. 4 is a graph showing the relationship between the incident angle $\theta i$ and the reflectance calculated from these equations assuming that the refractive index of air is ni=1 and the refractive index of an optical medium is nt=1.5 (in the case of general optical glass). Referring to FIG. 4, a curve 1 indicates the reflectance of horizontally polarized light, a curve 2 indicates the reflectance of vertically polarized light, and a curve 3 indicates the reflectance of natural polarized light.

As shown in FIG. 4, it is generally known that the reflectance Rp of horizontally polarized light is zero at the Brewster angle $\theta_B$ (in this embodiment, 55.88°) indicated by equation (1).

FIG. 4 shows that the reflectance (0%) when horizontally polarized light is incident at the Brewster angle $\theta_B$ on an optical medium is smaller than the reflectance (about 2% at a point A in FIG. 4) when horizontally polarized light is incident at an angle of 45° on the optical medium, i.e., the transmittance of light to an optical medium is higher when the light is incident at the Brewster angle. When this is applied to this embodiment, it is understood that when the horizontally polarized excitation laser beam from the solid-state laser 122 is incident at the Brewster angle $\theta_B$ on the I/O mirror 101, the transmittance of the excitation laser beam is higher than that when the beam is incident at an angle of 45° as in conventional apparatuses, so the excitation laser beam is introduced to the ring resonator 204 at a high efficiency.

Figure 5:
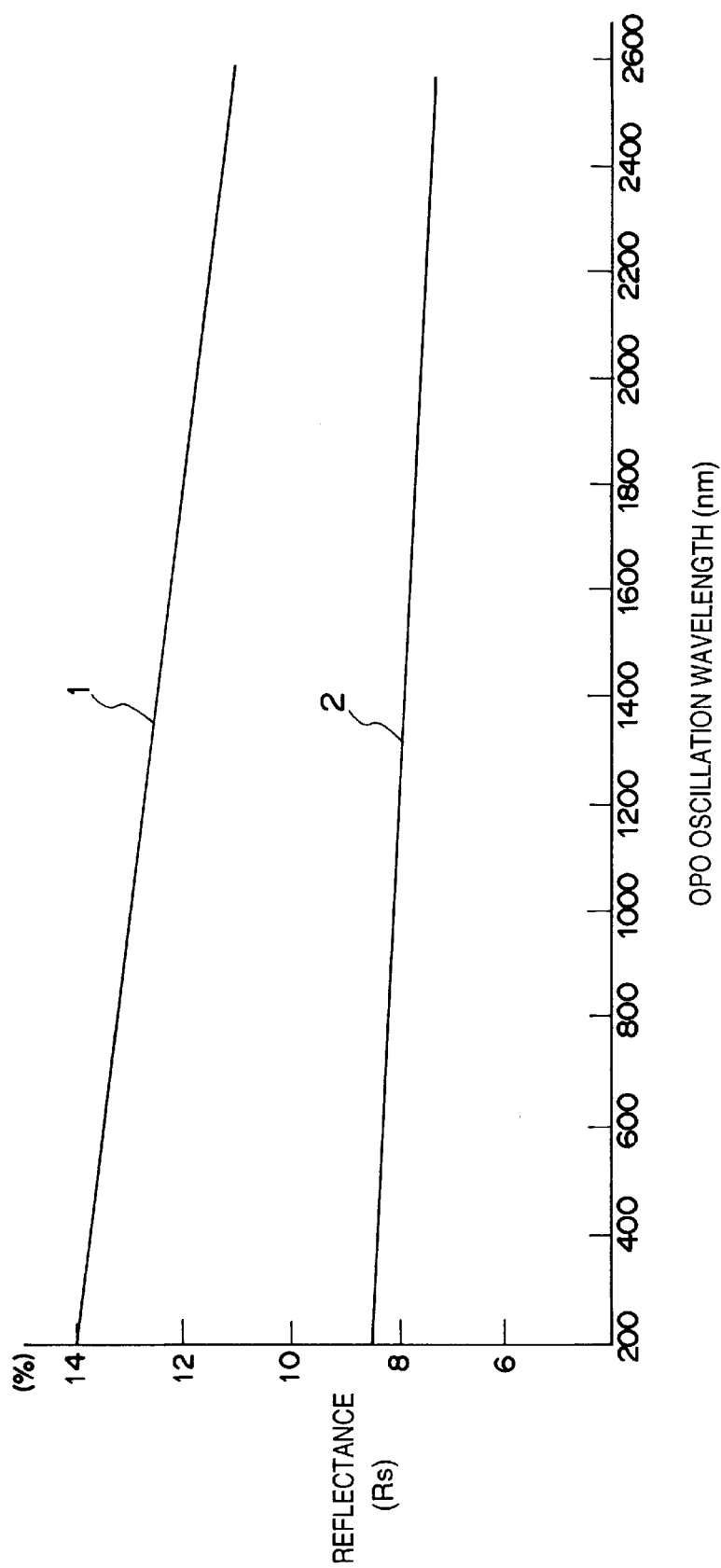
FIG. 5 is a graph showing the relationship between the OPO oscillating wavelength and the reflectance.

Also, the curve 2 in FIG. 4 indicates that the reflectance (about 14% at a point C in FIG. 4) when vertically polarized light is incident at the Brewster angle $\theta_B$ on an optical medium is higher than the reflectance (about 8% at a point B in FIG. 4) when the vertically polarized light is incident at an angle of 45° on the optical medium. FIG. 5 is a graph showing the relationship between the wavelength and the reflectance of vertically polarized light. It is apparent from FIG. 5 that the reflectance when the light is incident at the Brewster angle (a curve 1) is higher by 4 to 5% in an entire oscillation wavelength region of 410 to 2,600 nm than the reflectance when the light is incident at an angle of 45° (a curve 2). When this is applied to this embodiment, it is understood that when the vertically polarized laser beam oscillated by the BBO crystals 104 and 108 is incident at the Brewster angle $\theta B$ on the I/O mirror 101, a larger amount of oscillated light than when the beam is incident at an angle of 45° as in conventional apparatuses again travels round the ring resonator 204.

When the I/O is set at the Brewster angle as described above, the excitation laser beam can be introduced at a high efficiency to the ring resonator 204, and the laser beam oscillated by the BBO crystals 104 and 108 can be excited at a high efficiency in the ring resonator, compared to a case where the I/O mirror is set at 45°. Consequently, it is possible to increase the excitation efficiency and the oscillation efficiency and decrease the threshold value of oscillation.

A method of adjusting the continuous variable wavelength laser apparatus of this embodiment will be described below.

First, the solid-state laser 122 is turned on to emit an excitation laser beam to the I/O mirror 101 which is arranged at an angle of about 55° to this excitation laser beam as already described. The angle of the I/O mirror 101 is finely adjusted such that the output from the optical power meter 123 is a minimum. Consequently, the angle of the I/O mirror 101 is accurately adjusted such that the excitation laser beam is incident at the Brewster angle $\theta_B$ on the I/O mirror 101.

Subsequently, the solid-state laser 122 is turned off, and the He—Ne laser 117 is turned on to emit a laser beam to the 45° mirror 118 via the 45° mirror 119. Since the 45° mirror 118 is so coated as to totally reflect an He—Ne laser beam with a wavelength of 633 nm, the He—Ne laser beam is totally reflected and introduced to the ring resonator 204. The wavelength of an He—Ne laser looks red to the human eye. Therefore, the positions and angles of the angle calibration prism 102, the prism 103, the 45° total reflection prism 110, the dichroic mirror 124, and the pellin Broca prism 125 are adjusted by using this laser beam.

Subsequently, the He—Ne laser 117 is turned off, and the solid-state laser 122 is turned on again to emit a laser beam to the ring resonator 204. Consequently, the ring resonator 204 oscillates laser beams with wavelengths of 465±5 nm and 1,495±5 nm and outputs these laser beams to the pellin Broca prism 125. In this state, one of the two BBO crystals 104 and 108, arranged such that their crystal optical axes are inclined 28°, is pivoted through a small angle on the pivoting table 105 or 107 so that the power of the output laser beam from the pellin Broca prism 125 is a maximum. In this manner, the optical axes of the two BBO crystals 104 and 108 can be synchronized.

The adjustment of the continuous variable wavelength laser apparatus 200 is thus complete.

The operation of the laser apparatus 200 adjusted as above will be described below.

First, the solid-state laser 122 is turned on, and the output excitation laser beam is incident at the Brewster angle $\theta_B$ (55.88°) on the I/O mirror 101 via the 45° total reflection mirrors 121 and 120 and the 45° mirror 118. As already described above, the excitation laser beam transmits through the I/O mirror 101 at a transmittance of substantially 100% and is introduced at a high efficiency to the ring resonator 204. The introduced excitation light is incident on the BBO crystals 104 and 108 via the angle calibration prism 102 and the prism 103. Since the BBO crystals 104 and 108 are so arranged that their crystal optical axes are inclined 28° to the optical axis of the resonator (a positive incident state), the BBO crystals 104 and 108 oscillate two vertically polarized laser beams with wavelengths of 465±5 nm and 1,495±5 nm. These vertically polarized laser beams are incident at the Brewster angle $\theta_B$ on the I/O mirror 101 via the 45° total reflection prism 110. The vertically polarized laser beams are reflected at a high reflectance by the I/O mirror 101 and amplified at a high efficiency in the ring resonator 204.

A portion of the vertically polarized laser beams incident on the I/O mirror 101 transmits through the I/O mirror 101 and enters the dichroic mirror 124. A 354.7 nm excitation light component remaining in the oscillated light transmitted through the I/O mirror 101 is totally reflected and removed from the output light by the dichroic mirror 124, and only the pure oscillated light is incident on the pellin Broca prism 125. The pellin Broca prism 125 spectrally diffracts light components with a plurality of wavelengths in the oscillated light and outputs the spectrally diffracted light to the outside. When the BBO crystals 104 and 108 are arranged in the positive incident state as described above, the beran blocker prism outputs laser beams with wavelengths of 465 and 1,495 nm. To output a laser beam with a wavelength other than these wavelengths, the stepping motor 116 is rotated to pivot the pivoting tables 105 and 107, thereby changing the directions of the crystal optical axes of the BBO crystals 104 and 108 to the optical axis of the resonator. In this manner, the apparatus of this embodiment can continuously vary the wavelength of an output laser beam from 410 to 2,600 nm. In the experiment conducted by the present inventors, the wavelength of an output laser beam could be continuously changed with a resolving power of 0.1 nm by using a stepping motor and a stage on the market in the pivoting mechanism 206.

In this embodiment as described above, excitation light and light traveling round the ring resonator are incident at the Brewster angle on the I/O mirror. Consequently, it is possible to increase the excitation efficiency and the oscillation efficiency and decrease the oscillation threshold value.

Also, the optical components constituting the ring resonator are not coated with, e.g., a dielectric film. Accordingly, burning of a film or the like does not take place, so the durability can be improved.

Note that the multi-wavelength laser apparatus or the continuous variable wavelength laser apparatus described above is preferably applied to the field of medical treatments. By the use of the multi-wavelength laser apparatus, several photosensitive medicines having different absorption wavelengths can be simultaneously used in conventionally performed photo-chemical treatments for cancers. This dramatically improves the effects of the treatments. Also, the laser output is increased in the continuous variable wavelength laser apparatus. Therefore, it is possible not only to perform a treatment for nevus by which the irradiation wavelength is matched with the color of a skin tissue, but also to match the irradiation wavelength with the color of any living tissue requiring cauterization or abrasion or to select a laser wavelength matching a dye incorporated into a living tissue. This greatly contributes to the progress of the techniques of these treatments.

The present invention is not limited to the above embodiments and various changes and modifications can be made within the spirit and scope of the present invention. Therefore, to apprise the public of the scope of the present invention the following claims are made.

What is claimed is:

1. A continuous variable wavelength laser apparatus including an optical parametric oscillator having a pivotally arranged nonlinear optical crystal and an excitation laser light source, comprising:

pivoting means for pivoting said nonlinear optical crystal; and a ring type resonator including a mirror for transmitting an excitation laser beam emitted from said excitation laser light source and reflecting a portion of a laser beam whose wavelength is converted by said nonlinear optical crystal while transmitting the rest of the laser beam, at least two prisms for reflecting the wavelength-converted laser beam, and an angle calibration prism for compensating the optical path of the laser beam so that an incident angle of the wavelength-converted laser beam on said mirror is set as a Brewster angle, said ring type resonator resonating the wavelength-converted laser beam, wherein an incident angle of the excitation laser beam on said mirror is set as a Brewster angle.

2. The apparatus according to claim 1, further comprising control means for controlling a pivoting angle of said nonlinear optical crystal to an angle at which the laser wavelength converted by said nonlinear optical crystal is a target wavelength.

3. The apparatus according to claim 1, wherein in said laser beam reflecting means in said incident portion of said ring resonator, a linearly polarized laser beam having a wavelength of 354.7 nm and parallel to an incident plane is used as the excitation laser beam.

4. The apparatus according to claim 3, wherein a laser beam wavelength-converted by nonlinear optical crystal in an entire wavelength region can be output as linearly polarized light perpendicular to the incident plane.

5. The apparatus according to claim 1, wherein one of quartz glass, synthetic quartz glass, CaF$_2$, LiF, and NaCl is used as a material of said laser beam reflecting means in said incident portion of said ring resonator.

6. A continuous variable wavelength laser apparatus including a nonlinear optical crystal, and a ring resonator having a plurality of laser beam reflecting means for resonating an excitation laser beam to be incident on said nonlinear optical crystal, comprising:

a ring resonator including a calibration prism for correcting an optical path of an output wavelength-converted laser beam from said nonlinear optical crystal, a prism for totally reflecting the wavelength-converted laser beam at an angle of 180°, and two of said nonlinear optical crystals; and pivoting means for pivoting said two nonlinear optical crystals in opposite directions.

7. The apparatus according to claim 6, wherein said two nonlinear optical crystals are arranged on one side of said prism for totally reflecting the wavelength-converted laser beam at an angle of 180° while directions of optical axes of said two nonlinear optical crystals are symmetrical about a plane, and are arranged on the same oscillation optical axis of said ring resonator.

* * * * *

UNITED STATES PATENT AND TRADEMARK OFFICE
CERTIFICATE OF CORRECTION

PATENT NO. : 6,011,809
DATED : January 4, 2000
INVENTOR(S) : Fuki TOSAKA

It is certified that error appears in the above-identified patent and that said Letters Patent is hereby corrected as shown below:

On the title page, under "Other Publications", delete "B-BaB204" and insert -- ß-BaB204 -- in both instances.

In Column 1, delete lines 14-16 and insert -- light are announced in B. И, Aran, В. К. Еазылев (Ж П С(25)791, 1976), FU YUN peng (Laser, 7-12, 10, 1980), or В. В. Вайнер ,и др (Кавант. Электр , (10) 672, 1983). --

Signed and Sealed this

Twenty-third Day of January, 2001

Attest:

Q. TODD DICKINSON

Attesting Officer

Commissioner of Patents and Trademarks